(12) United States Patent
Tamaoka et al.

(10) Patent No.: US 9,348,379 B2
(45) Date of Patent: May 24, 2016

(54) FAN

(71) Applicant: NIDEC CORPORATION, Kyoto (JP)

(72) Inventors: Takehito Tamaoka, Kyoto (JP); Hiroaki Hirano, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 199 days.

(21) Appl. No.: 14/209,524

(22) Filed: Mar. 13, 2014

(65) Prior Publication Data

US 2015/0043159 A1 Feb. 12, 2015

(30) Foreign Application Priority Data

Aug. 7, 2013 (JP) ................................. 2013-163736

(51) Int. Cl.
| | |
|---|---|
| *G06F 1/20* | (2006.01) |
| *H05K 5/00* | (2006.01) |
| *H05K 7/20* | (2006.01) |
| *F04D 25/06* | (2006.01) |
| *F04D 29/063* | (2006.01) |
| *F04D 29/42* | (2006.01) |
| *F04D 29/58* | (2006.01) |

(52) U.S. Cl.
CPC ............ *G06F 1/203* (2013.01); *F04D 25/0606* (2013.01); *F04D 29/063* (2013.01); *F04D 29/4226* (2013.01); *F04D 29/5806* (2013.01)

(58) Field of Classification Search
CPC ............... F04D 25/0606; F04D 29/063; F04D 29/4226; F04D 29/5806; G06F 1/203
USPC ........ 361/679.46–679.54, 688–723; 417/354, 417/410.1, 423.12
See application file for complete search history.

(56) References Cited

U.S. PATENT DOCUMENTS

| | | |
|---|---|---|
| 2003/0164653 A1 | 9/2003 | Yasuda |
| 2006/0188187 A1 | 8/2006 | Kurimura et al. |

(Continued)

FOREIGN PATENT DOCUMENTS

| | | |
|---|---|---|
| CN | 1460158 A | 12/2003 |
| CN | 1821598 A | 8/2006 |

(Continued)

OTHER PUBLICATIONS

Related to U.S. Appl. No. 14/208,999.

(Continued)

*Primary Examiner* — Anthony Haughton
*Assistant Examiner* — Yahya Ahmad
(74) *Attorney, Agent, or Firm* — Westerman, Hattori, Daniels & Adrian, LLP

(57) ABSTRACT

A blower fan according to a preferred embodiment of the present invention is a centrifugal fan. At least a portion of each of a plurality of blades of an impeller portion is arranged above a stator. A lower plate portion is arranged to define an air channel portion and an air outlet arranged on a lateral side of the impeller portion when a side wall portion arranged to surround an outer circumference of the impeller portion and an upper plate portion arranged above the impeller portion are present. The air channel portion is arranged to extend in a circumferential direction between an outer circumference of the stator and the side wall portion. At least a portion of a circuit board is arranged in the air channel portion and on the lower plate portion. A plurality of lead wires extending from the stator are connected to the circuit board in the air channel portion.

16 Claims, 10 Drawing Sheets

(56) References Cited

U.S. PATENT DOCUMENTS

| | | | |
|---|---|---|---|
| 2006/0238057 A1* | 10/2006 | Tamaoka | G11B 19/2009 310/156.43 |
| 2007/0020085 A1* | 1/2007 | Takemoto | F04D 17/162 415/93 |
| 2009/0220360 A1 | 9/2009 | Zhang et al. | |
| 2013/0050872 A1* | 2/2013 | Sekii | G11B 25/043 360/99.08 |
| 2013/0050873 A1* | 2/2013 | Abe | H02K 1/146 360/99.08 |
| 2013/0164158 A1* | 6/2013 | Matsuba | F04D 17/16 417/410.1 |
| 2013/0323093 A1* | 12/2013 | Tamaoka | F04D 25/0613 417/354 |
| 2014/0212303 A1* | 7/2014 | Tamaoka | F04D 29/0513 417/354 |
| 2014/0219834 A1* | 8/2014 | Tamaoka | F04D 29/4226 417/354 |
| 2015/0023814 A1* | 1/2015 | Tamaoka | F04D 19/002 417/354 |
| 2015/0030268 A1* | 1/2015 | Tamaoka | F16C 33/104 384/100 |
| 2015/0043158 A1* | 2/2015 | Hirano | G06F 1/203 361/679.48 |
| 2015/0110649 A1* | 4/2015 | Tamaoka | F04D 17/16 417/354 |
| 2015/0198176 A1* | 7/2015 | Tamaoka | F04D 29/5853 361/679.49 |

FOREIGN PATENT DOCUMENTS

| | | |
|---|---|---|
| CN | 101520051 A | 9/2009 |
| CN | 201368044 Y | 12/2009 |
| CN | 202065212 U | 12/2011 |
| CN | 102340208 A | 2/2012 |
| CN | 202955001 U | 5/2013 |
| JP | 06-296353 A | 10/1994 |
| JP | 2001-241395 A | 9/2001 |
| JP | 2002-227841 A | 8/2002 |
| JP | 2006-226410 A | 8/2006 |
| JP | 2006-325279 A | 11/2006 |
| JP | 2009-203837 A | 9/2009 |
| JP | 2013-130094 A | 7/2013 |

OTHER PUBLICATIONS

Related to U.S. Appl. No. 14/208,725.

* cited by examiner

FAN

BACKGROUND OF THE INVENTION

1. Field of the Invention

The present invention relates to a blower fan of an inner-rotor type.

2. Description of the Related Art

In recent years, electronic devices, such as notebook personal computers and tablet personal computers, have been becoming thinner and thinner. In addition, such electronic devices have been becoming more and more sophisticated in functionality, causing a considerable increase in generation of heat in the electronic devices. Inside such slim electronic devices, a large number of electronic components are arranged, and a space occupied by an air is not large. Therefore, even in the case where components inside such an electronic device do not generate much heat, an increase in a temperature inside the electronic device may not be negligible. Accordingly, a blower fan is arranged in the electronic device with the view of cooling an interior of the electronic device.

In a slim electronic device, a centrifugal fan is arranged as a blower fan. The blower fan is required to have a certain air volume. Such blower fans are disclosed, for example, in JP-A 2013-130094 and JP-A 2001-241395. A centrifugal fan described in JP-A 2013-130094 is of an outer-rotor type. An electronic component arranging portion of a board is arranged in a region surrounded by a wide gap portion, an impeller, and an air outlet. A fan apparatus described in JP-A 2001-241395 is also of the outer-rotor type.

A blower fan of the outer-rotor type has a large rotating portion, and this makes it difficult to reduce the size of the blower fan of the outer-rotor type. Accordingly, a blower fan of an inner-rotor type may be adopted with the view of reducing the size of the blower fan. In this case, however, a large number of components of a motor portion are arranged to axially overlap with one another, and this makes it difficult to reduce the thickness of the blower fan of the inner-rotor type. As a result, it is difficult to secure a sufficient air volume while achieving a reduction in the thickness of the blower fan of the inner-rotor type.

SUMMARY OF THE INVENTION

A blower fan according to a preferred embodiment of the present invention includes a stationary portion, a bearing mechanism, and a rotating portion. The rotating portion is supported by the bearing mechanism to be rotatable about a central axis extending in a vertical direction with respect to the stationary portion. The stationary portion includes a lower plate portion, a stator, and a circuit board. The lower plate portion is arranged to extend in directions away from the central axis. The stator is annular and is arranged on the lower plate portion. The rotating portion includes a rotor magnet, a rotor hub portion, and an impeller portion. The rotor magnet is annular and is arranged radially inside the stator. To the rotor hub portion, the rotor magnet is directly fixed or indirectly fixed with another member intervening therebetween. The impeller portion is fixed to the rotor hub portion. The impeller portion includes a plurality of blades arranged in a circumferential direction. At least a portion of each of the blades is arranged above the stator. When a side wall portion arranged to surround an outer circumference of the impeller portion and an upper plate portion arranged above the impeller portion are present, the lower plate portion is arranged to define an air channel portion in which an air is caused by the impeller portion to flow in the circumferential direction and an air outlet arranged on a lateral side of the impeller portion together with the side wall portion and the upper plate portion. At least one of the upper plate portion and the lower plate portion includes an air inlet. The air channel portion is a space which is located between an outer circumference of the stator and the side wall portion, extends in the circumferential direction, and reaches an upper surface of the lower plate portion at an axially lower end. At least a portion of the circuit board is arranged in the air channel portion and on the lower plate portion. A plurality of lead wires extending from the stator are connected to the circuit board in the air channel portion.

The present invention is also directed to an electronic device including a blower fan.

The present invention makes it possible to secure a sufficient air volume while achieving a reduction in the thickness of a blower fan.

DETAILED DESCRIPTION OF THE PREFERRED EMBODIMENTS

Figure 1:
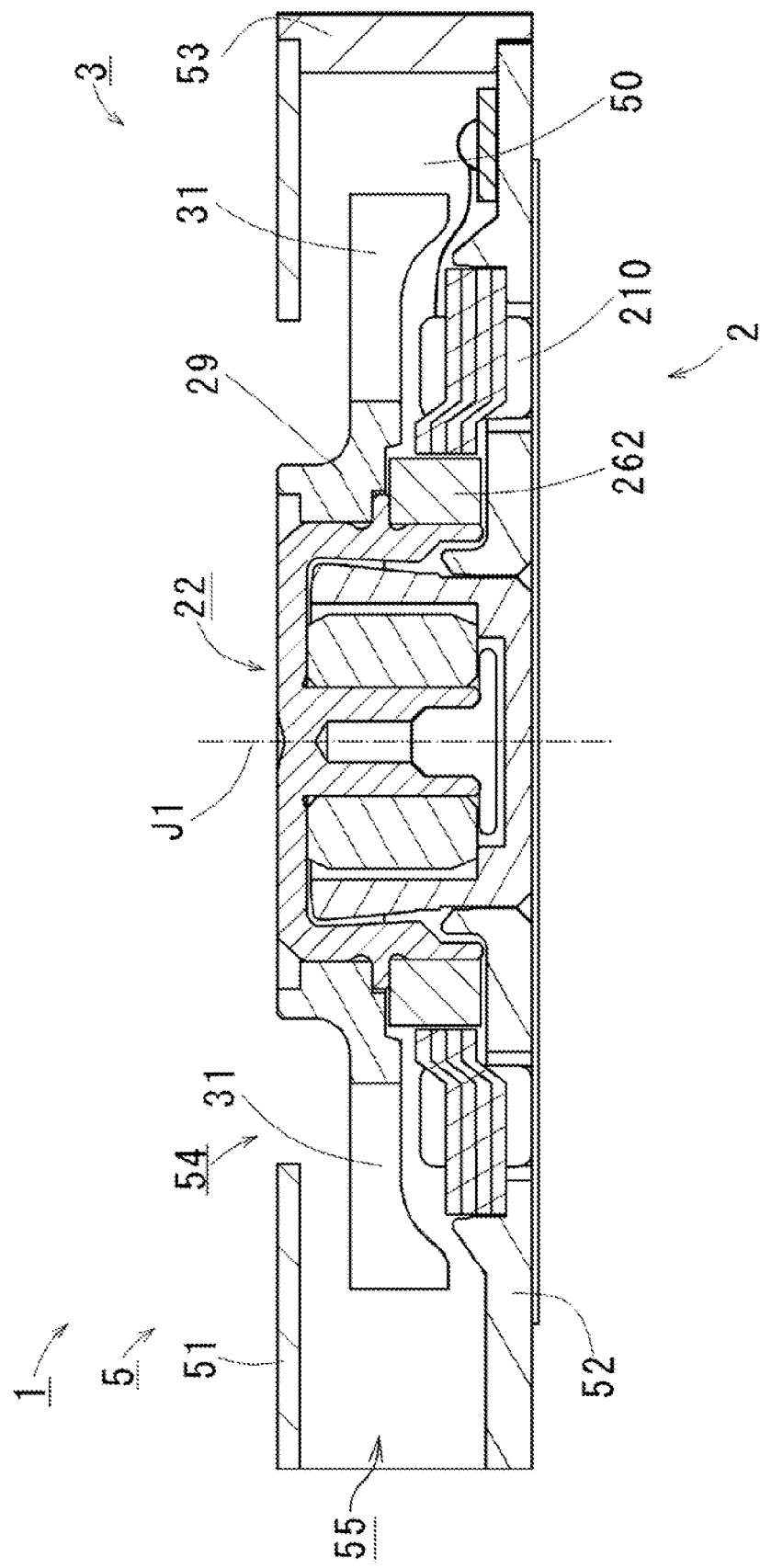
FIG. 1 is a vertical cross-sectional view of a blower fan according to a first preferred embodiment of the present invention.

It is assumed herein that an upper side and a lower side in a direction parallel to a central axis J1 of a blower fan 1 illustrated in FIG. 1 are referred to simply as an upper side and a lower side, respectively. Note that a vertical direction assumed herein may not necessarily correspond with a vertical direction of the blower fan 1 when the blower fan 1 is actually installed in a device. It is also assumed herein that a circumferential direction about the central axis J1 is simply referred to by the term "circumferential direction", "circumferential", or "circumferentially", that radial directions centered on the central axis J1 are simply referred to by the term "radial direction", "radial", or "radially", and that the direction parallel to the central axis J1 is simply referred to by the term "axial direction", "axial", or "axially".

FIG. 1 is a vertical cross-sectional view of the blower fan 1 according to a first preferred embodiment of the present invention. The blower fan 1 is a centrifugal fan. The blower fan 1 is, for example, installed in a notebook personal computer, and is used to cool devices inside a case of the computer.

The blower fan 1 includes a motor portion 2, an impeller portion 3, and a housing 5. A central axis of the impeller portion 3 coincides with the central axis J1 of the motor portion 2. The impeller portion 3 includes a plurality of blades 31. The blades 31 are arranged in the circumferential direction with the central axis J1 as a center. Because the blower fan 1 is of a thin type, the axial width of each blade 31 is arranged to be equal to or less than three times the thickness of the blade 31. The motor portion 2 is arranged to rotate the blades 31 about the central axis J1. The housing 5 is arranged to accommodate the motor portion 2 and the impeller portion 3.

The housing 5 includes an upper plate portion 51, a lower plate portion 52, and a side wall portion 53. The upper plate portion 51 is arranged above the impeller portion 3. The lower plate portion 52 is arranged to extend in directions away from the central axis J1 to cover a lower side of the blades 31. In the present preferred embodiment, the lower plate portion 52 is arranged to extend perpendicularly to the central axis J1. The motor portion 2 is fixed to the lower plate portion 52. The side wall portion 53 is arranged to surround an outer circumference of the impeller portion 3. The upper plate portion 51, the side wall portion 53, and the lower plate portion 52 are arranged to together define an air channel portion 50 arranged to surround the impeller portion 3. The air channel portion 50 is a space in which an air is caused by the impeller portion 3 to flow in the circumferential direction.

The upper plate portion 51 is made of a metal, such as an aluminum alloy or stainless steel, and is defined in the shape of a thin plate. Each of the lower plate portion 52 and the side wall portion 53 may be molded of a resin. Alternatively, each of the lower plate portion 52 and the side wall portion 53 may be made of an aluminum alloy and be molded by die casting. Alternatively, each of the lower plate portion 52 and the side wall portion 53 may be molded by forging. A lower end portion of the side wall portion 53 and an edge portion of the lower plate portion 52 are joined to each other through screws or the like. The upper plate portion 51 is fixed to an upper end portion of the side wall portion 53 by crimping or the like. The upper plate portion 51 includes an air inlet 54. The air inlet 54 is located above the impeller portion 3. The upper plate portion 51, the side wall portion 53, and the lower plate portion 52 are arranged to together define an air outlet 55 on a lateral side of the impeller portion 3. Note that the lower plate portion 52 is arranged to define a portion of a stationary portion of the motor portion 2. The stationary portion of the motor portion 2 will be described below.

In the motor portion 2, a current is supplied to a stator 210 to produce a torque centered on the central axis J1 between a rotor magnet 262 and the stator 210. This causes the blades 31 of the impeller portion 3 to rotate about the central axis J1. Rotation of the impeller portion 3 caused by the motor portion 2 causes an air to be drawn into the housing 5 through the air inlet 54 and sent out through the air outlet 55.

Figure 2:
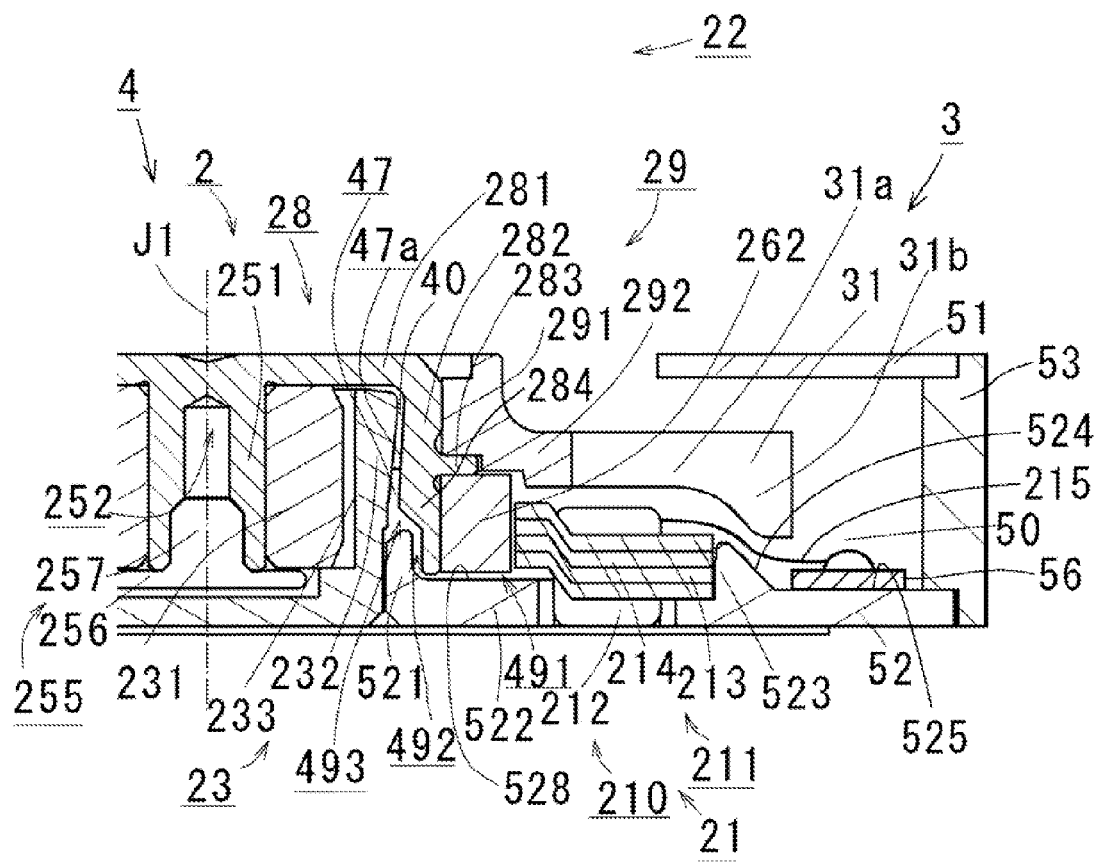
FIG. 2 is a vertical cross-sectional view of a motor portion of the blower fan and its vicinity.

FIG. 2 is a vertical cross-sectional view of the blower fan 1, illustrating the motor portion 2 and its vicinity. The motor portion 2 is of an inner-rotor type. In the case where the structure of the blower fan 1 is divided into a stationary portion 21, which is a stationary assembly, and a rotating portion 22, which is a rotating assembly, the housing 5 is included in the stationary portion 21 while the impeller portion 3 is included in the rotating portion 22. The stationary portion of the motor portion 2 is a portion of the stationary portion 21 of the blower fan 1. A rotating portion of the motor portion 2 is a portion of the rotating portion 22 of the blower fan 1. Since a bearing mechanism 4 is defined by a portion of the stationary portion 21 and a portion of the rotating portion 22 as described below, the blower fan 1 can be considered to include the stationary portion 21, the bearing mechanism 4, and the rotating portion 22 when the bearing mechanism 4 is regarded as a component of the blower fan 1. The rotating portion 22 is supported by the bearing mechanism 4 to be rotatable about the central axis J1 with respect to the stationary portion 21.

The stationary portion 21 includes the stator 210, a bearing portion 23, the lower plate portion 52, and a circuit board 56. Although, to be precise, the upper plate portion 51 and the side wall portion 53 are also included in the stationary portion 21, each of the upper plate portion 51 and the side wall portion 53 may be provided as a portion of a device in which the blower fan 1 is installed. That is, of all portions of the housing 5, only the lower plate portion 52 may be included in the stationary portion 21 before the blower fan 1 is installed in the device.

The bearing portion 23 has a bottom and is substantially cylindrical and centered on the central axis J1. The bearing portion 23 includes a sleeve 231 and a sleeve housing 232. The sleeve 231 is substantially cylindrical and centered on the central axis J1. The sleeve 231 is a metallic sintered body. The sleeve 231 is impregnated with a lubricating oil 40. An improvement in flexibility in choosing a material of an inner circumferential portion of the bearing portion 23 is achieved by the bearing portion 23 being composed of two components. In addition, an increase in the amount of the lubricating oil 40 held in the bearing portion 23 is easily achieved by the sleeve 231 being a sintered body.

The sleeve housing 232 has a bottom and is substantially cylindrical and centered on the central axis J1. The sleeve housing 232 is arranged to cover an outer circumferential surface and a lower surface of the sleeve 231. The sleeve 231 is fixed to an inner circumferential surface of the sleeve housing 232 through an adhesive 233. The sleeve housing 232 is made of a resin. Preferably, both adhesion and press fit are used to fix the sleeve 231 and the sleeve housing 232 to each other. A radially inner portion of the lower surface of the sleeve 231 is spaced away from an inner bottom surface of the sleeve housing 232 in the vertical direction. The lower surface of the sleeve 231 and the inner circumferential surface and the inner bottom surface of the sleeve housing 232 are arranged to together define a plate accommodating portion 239 (see FIG. 6).

The lower plate portion 52 includes a substantially circular through hole centered on the central axis J1. The lower plate portion 52 includes a bearing holding portion 521, a flat plate portion 522, and a stator holding portion 523. The bearing holding portion 521, the flat plate portion 522, and the stator holding portion 523 are preferably defined by a single continuous member. The bearing holding portion 521 is substantially cylindrical and centered on the central axis J1. The bearing holding portion 521 is arranged to extend axially upward from an inner end of the flat plate portion 522. The bearing holding portion 521 is arranged to hold the bearing portion 23 with an inner circumferential surface thereof. The inner circumferential surface of the bearing holding portion 521 is arranged to be in contact with a lower portion of an outer circumferential surface of the sleeve housing 232. The bearing holding portion 521 and the sleeve housing 232 are fixed to each other through an adhesive. Both the adhesive and press fit may be used to fix the bearing holding portion 521 and the sleeve housing 232 to each other.

The stator holding portion 523 is arranged to project upward from an upper surface of the lower plate portion 52, and is annular and centered on the central axis J1. The stator holding portion 523 is arranged radially outside the stator 210. The stator holding portion 523 is arranged in the air channel portion 50. An inner circumferential surface of the stator holding portion 523 is arranged to be in contact with an outer circumferential surface of the stator 210. An outer circumferential surface of the stator holding portion 523 is a slanting surface 524 arranged to extend radially outward with decreasing height.

The stator 210 is a substantially annular member centered on the central axis J1. The stator 210 is arranged on the lower plate portion 52, and is fixed to the inner circumferential surface of the stator holding portion 523. The stator 210 includes a stator core 211 and a plurality of coils 212. The stator core 211 is defined by laminated silicon steel sheets each of which is in the shape of a thin plate. The stator core 211 includes a substantially annular core back 213 and a plurality of teeth 214 arranged to project radially inward from the core back 213. Each of the coils 212 is defined by a conducting wire wound around a separate one of the teeth 214. The inner circumferential surface of the stator holding portion 523 is arranged to be in contact with an outer circumferential surface of the core back 213.

The core back 213 is inserted in and adhered to the stator holding portion 523. An upper end of the stator holding portion 523 is arranged at a level lower than that of an upper end of the core back 213. This contributes to reducing hindrance to a flow of an air from above the stator 210 to the air channel portion 50. In addition, it is made possible to arrange an upper end of each blade 31 at a lower position. Slight press fit or press fit may be used to fix the core back 213 and the stator holding portion 523 to each other. An adhesive may also be used when press fitting the core back 213 and the stator holding portion 523 to each other. Easy holding of the stator 210 is achieved by arranging the stator holding portion 523 in an annular shape. In order to reduce the thickness of the blower fan 1, a surface of the lower plate portion 52 on which the core back 213 is placed is arranged at a level higher than that of a lower end of each coil 212.

As mentioned above, the air channel portion 50 is defined at an outer circumferential portion of the lower plate portion 52. The bearing portion 23 is fixed to a central portion of the lower plate portion 52. The stator 210 is fixed to a portion of the lower plate portion 52 between the outer circumferential portion and the central portion. In the blower fan 1, both the stator 210 and the bearing portion 23 are directly fixed to the lower plate portion 52, which is a base portion.

The circuit board 56 is arranged radially outward of the stator holding portion 523. A portion of the circuit board 56 is arranged in the air channel portion 50 and on the lower plate portion 52. The circuit board 56 is adhered to the upper surface of the lower plate portion 52. In the air channel portion 50, a plurality of lead wires 215 extending from the stator 210 and the circuit board 56 are connected to each other through a solder. The circuit board 56 will be described in detail below.

The rotating portion 22 includes the impeller portion 3, a rotor hub portion 28, a coming-off preventing portion 255, and the rotor magnet 262. The rotor hub portion 28 is supported by the bearing portion 23. The impeller portion 3 is held on an outer circumferential portion of the rotor hub portion 28. All portions of the rotating portion 22 except the impeller portion 3 are included in the rotating portion of the motor portion 2. Note, however, that a boundary between the impeller portion 3 and the motor portion 2 does not need to be defined definitely.

The rotor hub portion 28 includes a shaft 251, a bearing opposing portion 281, a cylindrical seal portion 282, a raised portion 283, and a magnet holding portion 284. The shaft 251, the bearing opposing portion 281, the cylindrical seal portion 282, the raised portion 283, and the magnet holding portion 284 are defined by a single continuous member. The rotor hub portion 28 is preferably defined by subjecting a metal to a cutting process.

The shaft 251 is substantially columnar and centered on the central axis J1. The shaft 251 is inserted in the sleeve 231 of the bearing portion 23. In other words, the sleeve 231 is arranged to surround the shaft 25 from radially outside. The shaft 251 is arranged to rotate about the central axis J1 relative to the bearing portion 23.

The coming-off preventing portion 255 is arranged at a lower portion of the shaft 251. The coming-off preventing portion 255 includes a plate portion 256 and a plate fixing portion 257. The plate portion 256 is substantially in the shape of a disk and arranged to extend radially outward from a lower end portion of the shaft 251. The plate portion 256 is arranged to have a diameter smaller than that of the lower surface of the sleeve 231. The plate fixing portion 257 is arranged to extend upward from an upper surface of the plate portion 256. An outer circumferential surface of the plate fixing portion 257 includes a male screw portion defined therein. The shaft 251 includes a hole portion 252 arranged to extend upward from a lower end thereof. An inner circumferential surface of the hole portion 252 includes a female screw portion defined therein. The plate fixing portion 257 is screwed into the hole portion 252, whereby the plate portion 256 is fixed to the lower end portion of the shaft 251.

Both the sleeve 231 and the plate portion 256 are arranged inside the sleeve housing 232. The plate portion 256 is accommodated in the aforementioned plate accommodating portion 239. The upper surface of the plate portion 256 is a substantially annular surface. The upper surface of the plate portion 256 is arranged opposite to the lower surface of the sleeve 231, that is, a downward facing surface in the plate accommodating portion 239, in the vertical direction, i.e., in the axial direction. The plate portion 256 and the sleeve 231 are arranged to together prevent the shaft 251 from coming off the bearing portion 23. A lower surface of the plate portion 256 is arranged axially opposite the inner bottom surface of the sleeve housing 232.

The bearing opposing portion 281 is arranged to extend radially outward from an upper end of the shaft 251. The bearing opposing portion 281 is substantially in the shape of an annular plate and centered on the central axis J1. The bearing opposing portion 281 is arranged above the bearing portion 23 and axially opposite the bearing portion 23. The cylindrical seal portion 282 is substantially cylindrical, and is arranged to extend downward from the bearing opposing portion 281. The cylindrical seal portion 282 is continuous with an outer periphery portion of the bearing opposing portion 281. The cylindrical seal portion 282 is arranged radially outward of the bearing portion 23 and radially inward of the rotor magnet 262.

An inner circumferential surface of the cylindrical seal portion 282 is arranged radially opposite an upper portion of an outer circumferential surface of the bearing portion 23. A seal gap 47 is defined between the inner circumferential surface of the cylindrical seal portion 282 and the outer circumferential surface of the sleeve housing 232. A seal portion 47a, which has a surface of the lubricating oil 40 defined therein, is defined in the seal gap 47. The raised portion 283 is arranged to project radially outward from an outer circumferential surface of the cylindrical seal portion 282. An outer end of the raised portion 283 is arranged radially inward of an outer circumferential surface of the rotor magnet 262. The impeller portion 3 is arranged radially outward of the raised portion 283 and axially above the rotor magnet 262.

The magnet holding portion 284 is substantially cylindrical and is centered on the central axis J1. The magnet holding portion 284 is arranged to extend downward from the cylindrical seal portion 282. The rotor magnet 262 is substantially cylindrical and is centered on the central axis J1. The rotor magnet 262 is fixed to an outer circumferential surface of the magnet holding portion 284. The rotor magnet 262 is arranged radially inside the stator 210. An upper end of the stator 210 is arranged at a level lower than that of an upper end of the rotor magnet 262.

An upper surface of the flat plate portion 522 of the lower plate portion 52 and a lower end surface of the magnet holding portion 284 are arranged axially opposite each other. In addition, the upper surface of the flat plate portion 522 and a lower end surface of the rotor magnet 262 are also arranged axially opposite each other. An annular minute horizontal gap 491 extending radially is defined between the upper surface of the flat plate portion 522 and the lower end surface of the magnet holding portion 284 and between the upper surface of the flat plate portion 522 and the lower end surface of the rotor magnet 262. In other words, both the magnet holding portion 284 and the rotor magnet 262 are arranged axially opposite the flat plate portion 522 with the horizontal gap 491 intervening therebetween. The axial dimension of the horizontal gap 491 is preferably arranged to be in the range of about 0.1 mm to about 0.5 mm.

An annular minute vertical gap 492 extending in the axial direction is defined between an inner circumferential surface of the magnet holding portion 284 and an outer circumferential surface of the bearing holding portion 521. The vertical gap 492 is continuous with an inner circumferential portion of the horizontal gap 491, and is arranged to extend upward from the horizontal gap 491. An upper portion of the inner circumferential surface of the magnet holding portion 284 includes a slanting surface which is angled radially inward with increasing height. An annular minute intermediate gap 493 is defined between this slanting surface and an upper end surface of the bearing holding portion 521. The intermediate gap 493 is continuous with an upper end portion of the vertical gap 492. In other words, the intermediate gap 493 is arranged to join the upper end portion of the vertical gap 492 and a lower end portion of the seal gap 47 to each other.

The horizontal gap 491, the vertical gap 492, and the intermediate gap 493 are arranged to together define a labyrinth structure radially outward of the seal gap 47. This contributes to preventing an air including the lubricating oil 40 evaporated from the seal gap 47 from traveling out of the bearing mechanism 4. As a result, a reduction in evaporation of the lubricating oil 40 out of the bearing mechanism 4 is achieved.

The impeller portion 3 includes an impeller support portion 29 and the plurality of blades 31. The impeller support portion 29 includes an impeller cylindrical portion 291 and an impeller ring portion 292. Each blade 31 includes an inner blade portion 31a and an outer blade portion 31b. The impeller cylindrical portion 291, the impeller ring portion 292, and the blades 31 are preferably defined by a single continuous member.

The impeller ring portion 292 is arranged substantially in the shape of a disk and is centered on the central axis J1. The impeller ring portion 292 is arranged to extend radially outward from a lower end of the impeller cylindrical portion 291. In other words, the impeller cylindrical portion 291 is arranged to extend axially upward from an inner circumferential portion of the impeller ring portion 292. The impeller cylindrical portion 291 is substantially cylindrical and centered on the central axis J1. The blades 31 are arranged radially outside the impeller ring portion 292. The blades 31 are arranged in the circumferential direction with the central axis J1 as the center. The blades 31 are joined to the impeller cylindrical portion 291 through the impeller ring portion 292. An inner circumferential surface of the impeller cylindrical portion 291 is arranged opposite to the outer circumferential surface of the cylindrical seal portion 282.

The inner circumferential surface of the impeller cylindrical portion 291 is fixed to the outer circumferential surface of the cylindrical seal portion 282. The rotor hub portion 28 is inserted in the impeller support portion 29. The rotor hub portion 28 and the impeller support portion 29 are fixed to each other through insertion and adhesion or through adhesion and press fit. The lower end of the impeller cylindrical portion 291 is arranged to be in contact with an upper surface of the raised portion 283. Note that the rotor hub portion 28 and the impeller portion 3 may be defined by a single continuous member.

An inner end portion of the inner blade portion 31a is joined to the impeller ring portion 292, while an outer portion of the inner blade portion 31a is defined integrally with the outer blade portion 31b. The inner end portion of the inner blade portion 31a is arranged radially inward of an outer circumference of the stator 210, while an outer end portion of the inner blade portion 31a is substantially arranged radially outward of the outer circumference of the stator 210. The impeller ring portion 292 functions as a base portion of each blade 31. The inner end portion of each inner blade portion 31a is arranged above the stator 210. An upper end of the inner blade portion 31a is arranged at the same axial position as that of an upper end of the impeller ring portion 292. A strength with which each blade 31 is held is thereby sufficiently secured. The upper end of the inner blade portion 31a is arranged at a level higher than that of the upper surface of the raised portion 283 and that of an upper surface of the rotor magnet 262. A portion of the air inlet 54 is located in a portion of an area over the inner blade portion 31a. A lower end of the inner end portion of the inner blade portion 31a is arranged at the same axial position as that of a lower end of the impeller ring portion 292. The lower end of the inner blade portion 31a is arranged at a level lower than that of a lower surface of the raised portion 283 and that of the upper surface of the rotor magnet 262. Lowering of a lower end of each blade 31 makes it possible to secure a sufficient axial dimension of the blade 31 while lowering the position of the blade 31, and thereby to secure a sufficient air volume. The inner blade portion 31a is arranged axially opposite the coil 212.

An inner end portion of the outer blade portion 31b is joined to the inner blade portion 31a. The inner blade portion 31a and the outer blade portion 31b are joined to each other substantially over the stator holding portion 523. The outer blade portion 31b is arranged to have an axial dimension greater than that of the inner blade portion 31a. An outer end of the outer blade portion 31b is arranged opposite to an inner surface of the side wall portion 53. An upper end of the outer blade portion 31b is arranged at the same axial position as that of the upper end of the inner blade portion 31a. The upper end of the outer blade portion 31b is arranged opposite to a lower surface of the upper plate portion 51. A lower end of the outer blade portion 31b is arranged at a level lower than that of the upper end of the rotor magnet 262, more preferably, at a level lower than that of the upper end of the stator 210. The lower end of the outer blade portion 31b is arranged opposite to the lower plate portion 52.

In the blower fan 1, it is possible to extend a portion of each blade 31 downward on a radially outer side of the stator 210, and thereby to secure a sufficient axial dimension of the blade 31. This leads to improvements in an air volume characteristic and a static pressure characteristic. In addition, an air current caused by the outer blade portion 31b of each blade 31 tends to pass above the stator 210, and this leads to an improvement in efficiency with which the stator 210 is cooled.

In the blower fan 1, at least a portion of each blade 31 is located over the stator 210. That is, a space between the blades 31 and the stator 210 is joined to a space between the blades 31 and the upper plate portion 51 through spaces between the blades 31. This enables an air axially sucked to directly impinge on the stator 210 to forcibly cool the stator 210. An inner circumferential surface of the core back 213 is arranged radially outward of all of the base portions of the blades 31 and the rotor hub portion 28, and this arrangement makes it possible to cool the entire core back 213.

Moreover, a radially outer edge of each coil 212 is arranged radially outward of all of the base portions of the blades 31 and the rotor hub portion 28. This makes it possible to directly cool the coils 212. Furthermore, because a portion of the air sucked in passes between the coils 212, an additional improvement in cooling efficiency is achieved.

Note that a molding resin may be arranged between adjacent ones of the coils 212 to allow the air to quickly flow out of the stator 210 without passing between the coils 212. This prevents a deterioration in the air volume characteristic.

In FIG. 2, the blades 31 are indirectly fixed to the outer circumferential surface of the cylindrical seal portion 282 through the impeller support portion 29. Note that the blades 31 may be directly fixed to the outer circumferential surface of the cylindrical seal portion 282 without any other member, such as the impeller support portion 29, intervening therebetween.

In the blower fan 1, the upper end of the stator 210 is arranged at a level lower than that of the upper end of the rotor magnet 262, and the impeller portion 3 is arranged axially above the rotor magnet 262, and is arranged to extend radially outward. The blades 31 are arranged axially above the stator 210. The above arrangements make it possible to secure a sufficient axial distance between the lower end of each blade 31 and the upper end of the stator 210. Moreover, a sufficient axial dimension of each blade 31 can be secured while preventing the blade 31 from interfering with the stator 210. A sufficient air volume can thereby be secured.

In addition, the above arrangements make it possible to secure a sufficient axial distance between the upper plate 51 and each blade 31. That is, the above arrangements make it possible to arrange the blades 31 at a relatively low level for the axial height of the entire blower fan 1 while securing a sufficient distance between the stator 210 and each blade 31. In the case where an electronic device in which the blower fan 1 is installed is a slim electronic device, that is, in the case where a large proportion of a space inside a case of the electronic device is occupied by electronic components, and a sufficient space is not secured above the air inlet 54 of the blower fan 1, efficiency with which an air is sucked is low. Adoption of the structure of the blower fan 1 described above makes it possible to secure a space in which an air to enter into the blades 31 can stay. This enables the blower fan 1 to have an excellent air volume characteristic.

The air channel portion 50 can be defined as a space which is located between the outer circumference of the stator 210 and the side wall portion 53, extends in the circumferential direction, and reaches the upper surface of the lower plate portion 52 at an axially lower end. Needless to say, the air channel portion 50 does not need to be definitely defined as long as the air channel portion 50 is regarded as substantially occupying the above-described space. The outer blade portion 31b and a portion of the inner blade portion 31a move in the air channel portion 50.

Referring to FIG. 1, in the blower fan 1, the axial distance between an upper end edge of the air inlet 54 and the upper end of each blade 31 is arranged to be greater than the axial distance between the lower end of the blade 31 and the stator 210. This leads to an increase in the amount of air sucked in and an increase in the air volume.

Figure 3:
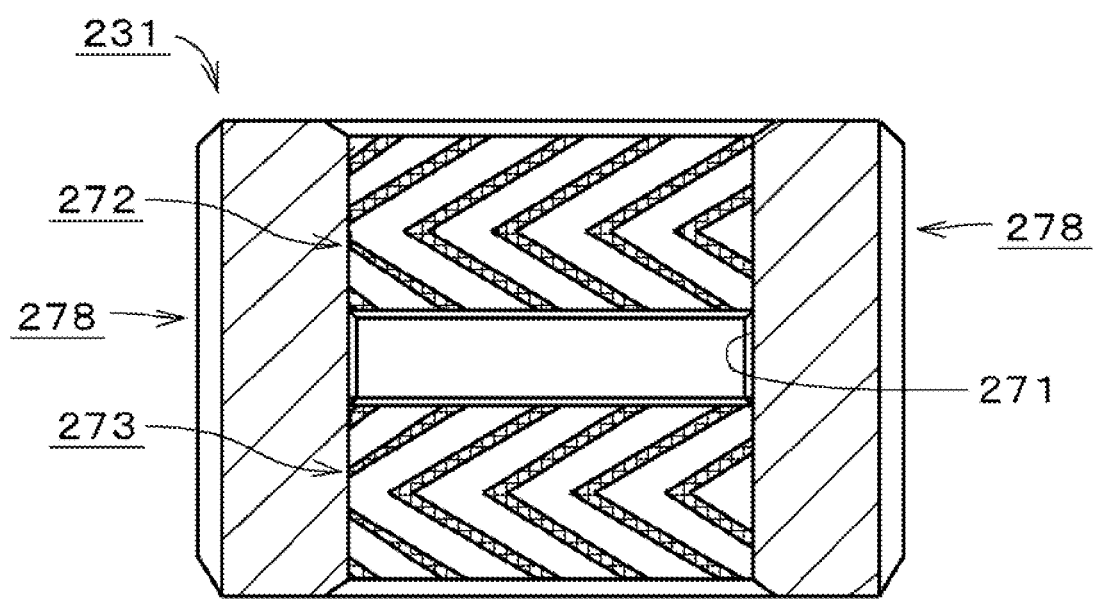
FIG. 3 is a vertical cross-sectional view of a sleeve according to the first preferred embodiment.
Figure 4:
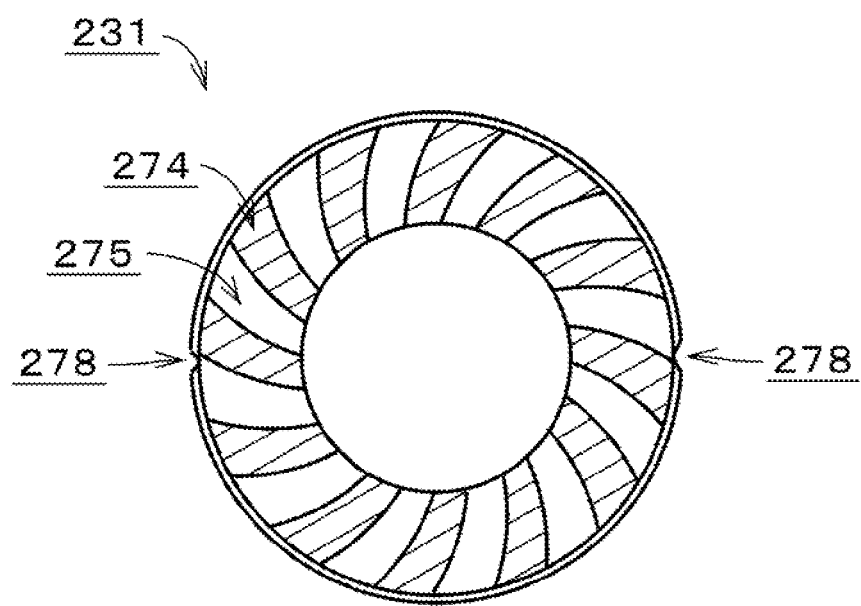
FIG. 4 is a plan view of the sleeve.
Figure 5:
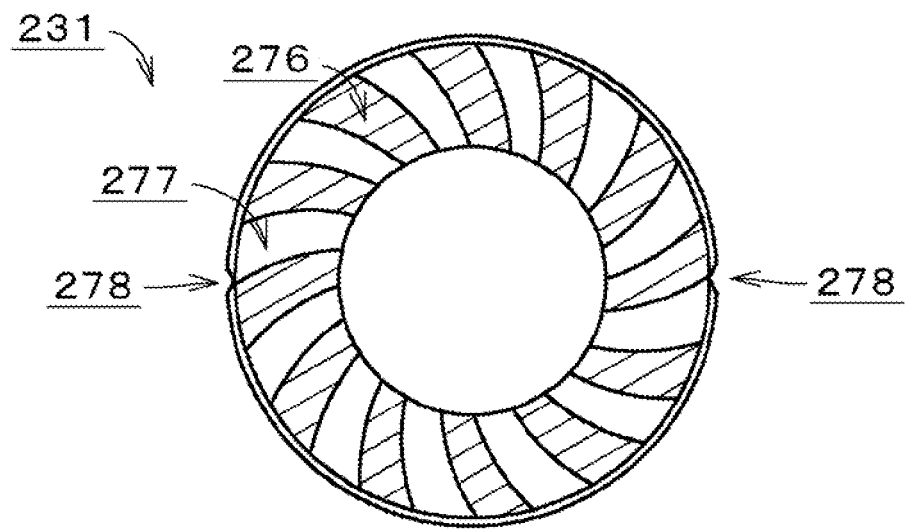
FIG. 5 is a bottom view of the sleeve.

FIG. 3 is a vertical cross-sectional view of the sleeve 231. An upper portion and a lower portion of an inner circumferential surface 271 of the sleeve 231 include a first radial dynamic pressure groove array 272 and a second radial dynamic pressure groove array 273, respectively. Each of the first and second radial dynamic pressure groove arrays 272 and 273 is made up of a plurality of grooves arranged in a herringbone pattern. FIG. 4 is a plan view of the sleeve 231. An upper surface 274 of the sleeve 231 includes a first thrust dynamic pressure groove array 275 made up of a plurality of grooves arranged in a spiral pattern. FIG. 5 is a bottom view of the sleeve 231. A lower surface 276 of the sleeve 231 includes a second thrust dynamic pressure groove array 277 arranged in a spiral pattern.

Note that each of the first and second radial dynamic pressure groove arrays 272 and 273 may be defined in an outer circumferential surface of the shaft 251. Also note that the first thrust dynamic pressure groove array 275 may be defined in a region of a lower surface of the bearing opposing portion 281 which is opposed to the upper surface 274 of the sleeve 231. Also note that the second thrust dynamic pressure groove array 277 may be defined in the upper surface of the plate portion 256. Also note that the first thrust dynamic pressure groove array 275 may be made up of a collection of grooves arranged in a herringbone pattern. Also note that the second thrust dynamic pressure groove array 277 may also be made up of a collection of grooves arranged in a herringbone pattern. Two grooves 278 each of which extends in the axial direction are defined in the outer circumferential surface of the sleeve 231. Each groove 278 is used for circulation of the lubricating oil 40.

Figure 6:
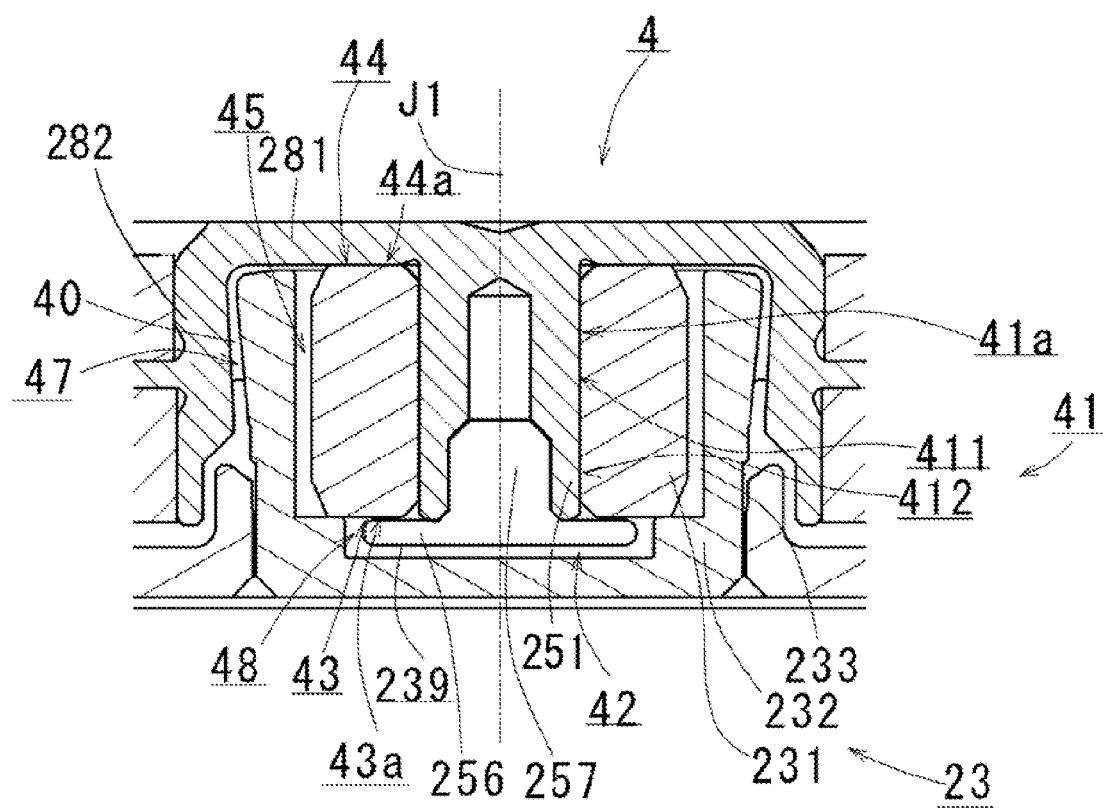
FIG. 6 is a vertical cross-sectional view of a bearing portion according to the first preferred embodiment and its vicinity.

FIG. 6 is a vertical cross-sectional view of the bearing portion 23 and its vicinity. A lower gap 42 is defined between the plate portion 256 and the sleeve housing 232. The lubricating oil 40 is arranged in the lower gap 42. A plate surrounding space 48 is defined between a side surface of the plate portion 256 and an inside surface of a bottom portion of the sleeve housing 232. The lubricating oil 40 exists in the plate surrounding space 48. A second thrust gap 43 is defined between the lower surface of the sleeve 231 and the upper surface of the plate portion 256. The lubricating oil 40 is arranged in the second thrust gap 43. The second thrust gap 43 is arranged to define a second thrust dynamic pressure bearing portion 43a arranged to generate a fluid dynamic pressure in the lubricating oil 40. The plate surrounding space 48 enables the lubricating oil 40 to exist continuously from an outer circumferential portion of the second thrust gap 43 to an outer circumferential portion of the lower gap 42.

A radial gap 41 is defined between the outer circumferential surface of the shaft 251 and the inner circumferential surface of the sleeve 231. A lower end portion of the radial gap 41 is continuous with an inner circumferential portion of the second thrust gap 43. The radial gap 41 includes a first radial gap 411 and a second radial gap 412 arranged below the first radial gap 411.

The first radial gap 411 is defined between the outer circumferential surface of the shaft 251 and a portion of the inner circumferential surface of the sleeve 231 in which the first radial dynamic pressure groove array 272 illustrated in FIG. 3 is defined. Meanwhile, the second radial gap 412 is defined between the outer circumferential surface of the shaft 251 and a portion of the inner circumferential surface of the sleeve 231 in which the second radial dynamic pressure groove array 273 is defined. The lubricating oil 40 is arranged in the radial gap 41. The first and second radial gaps 411 and 412 are arranged to together define a radial dynamic pressure bearing portion 41a arranged to generate a fluid dynamic pressure in the lubricating oil 40. The shaft 251 is radially supported by the radial dynamic pressure bearing portion 41a.

A first thrust gap 44 is defined between an upper surface of the bearing portion 23 and the lower surface of the bearing opposing portion 281. The first thrust gap 44 is arranged to extend radially outward from an upper end portion of the radial gap 41. The lubricating oil 40 is arranged in the first thrust gap 44. A first thrust dynamic pressure bearing portion 44a arranged to generate a fluid dynamic pressure in the lubricating oil 40 is defined in a region of the first thrust gap 44 in which the first thrust dynamic pressure groove array 275 illustrated in FIG. 4 is defined. That is, a gap defined between the upper surface 274 of the sleeve 231 and the lower surface of the bearing opposing portion 281 is arranged to define the first thrust dynamic pressure bearing portion 44a arranged to generate the fluid dynamic pressure in the lubricating oil 40.

The bearing opposing portion 281 is axially supported by both the first and second thrust dynamic pressure bearing portions 44a and 43a. Provision of the first and second thrust dynamic pressure bearing portions 44a and 43a contributes to reducing a variation in vertical play of the shaft 251. The aforementioned seal gap 47 is arranged to extend downward from an outer circumferential portion of the first thrust gap 44.

Circulation channels 45 are defined by the grooves 278 illustrated in FIG. 3 between the outer circumferential surface of the sleeve 231 and the inner circumferential surface of the sleeve housing 232. Each circulation channel 45 is arranged to cause an outer circumferential portion of the first thrust dynamic pressure bearing portion 44a and an outer circumferential portion of the second thrust dynamic pressure bearing portion 43a to be in communication with each other.

In the motor portion 2, the seal gap 47, the first thrust gap 44, the radial gap 41, the second thrust gap 43, the plate surrounding space 48, the lower gap 42, and the circulation channels 45 are arranged to together define a single continuous bladder structure, and the lubricating oil 40 is arranged continuously in this bladder structure. Within the bladder structure, the surface of the lubricating oil 40 is defined only in the seal gap 47, which is located between the inner circumferential surface of the cylindrical seal portion 282 and the outer circumferential surface of the bearing portion 23. The bladder structure contributes to easily preventing a leakage of the lubricating oil 40.

The bearing mechanism 4 of the motor portion 2 includes the shaft 251, the sleeve 231, the sleeve housing 232, the adhesive 233, the plate portion 256, the bearing opposing portion 281, the cylindrical seal portion 282, and the aforementioned lubricating oil 40. In the bearing mechanism 4, the shaft 251, the plate portion 256, the bearing opposing portion 281, and the cylindrical seal portion 282 are arranged to rotate about the central axis J1 relative to the bearing portion 23 through the lubricating oil 40.

Regarding the blower fan 1, in the case where the rotor hub portion 28 is defined by subjecting the metal to the cutting process, precision with which the rotor hub portion 28 is shaped is improved. This enables each of the radial dynamic pressure bearing portion 41a, the first thrust dynamic pressure bearing portion 44a, the second thrust dynamic pressure bearing portion 43a, and the seal gap 47 to be defined with high precision.

Figure 7:
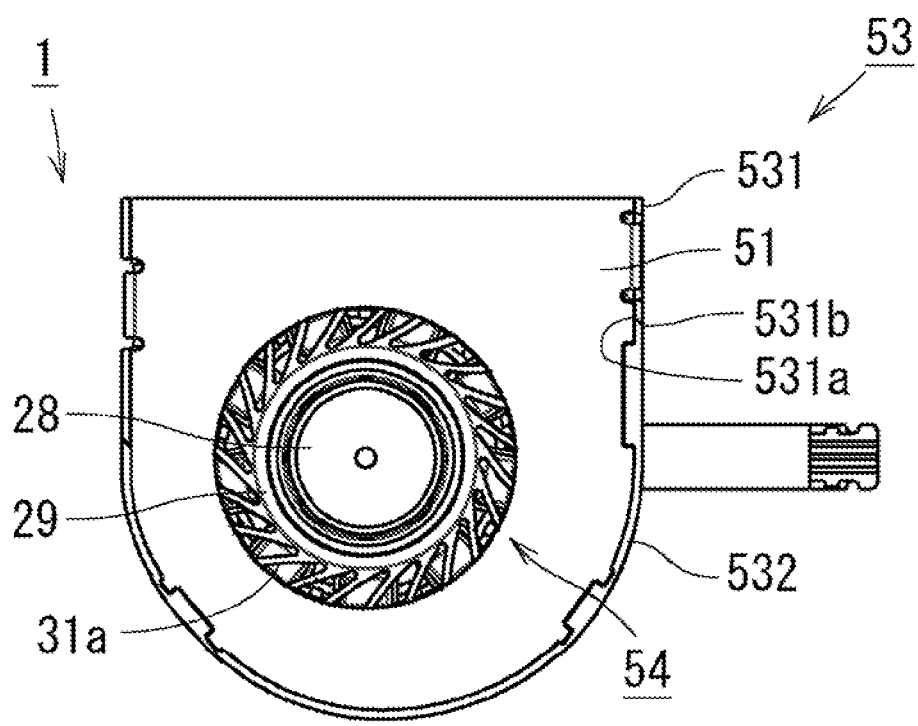
FIG. 7 is a plan view of the blower fan.
Figure 8:
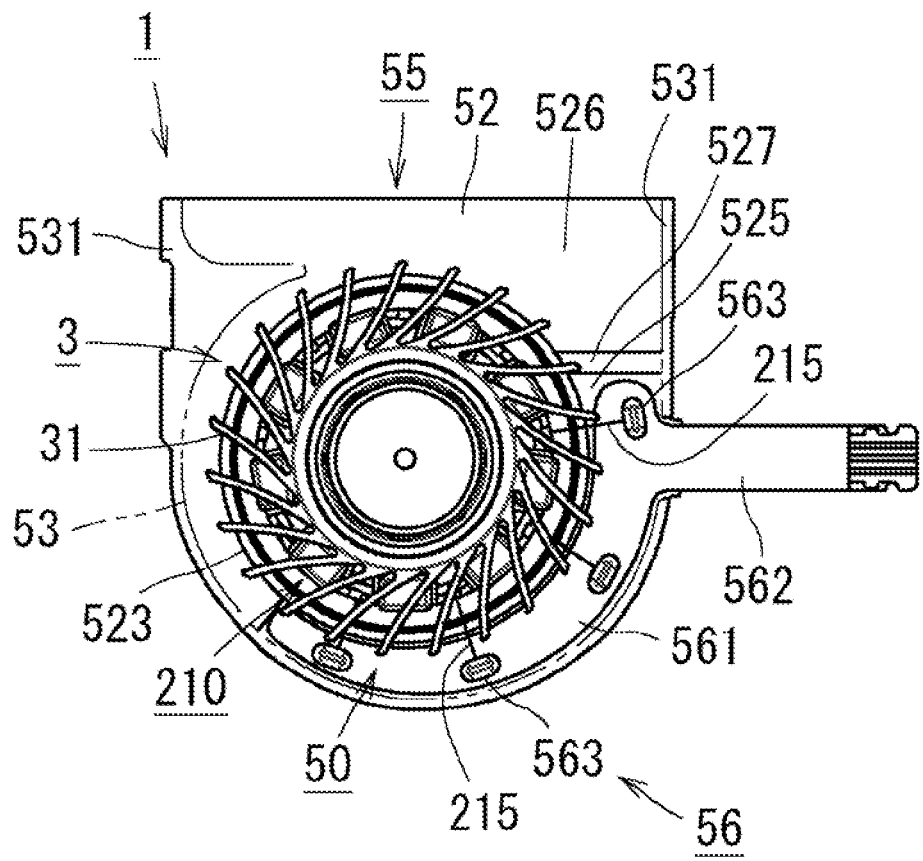
FIG. 8 is a plan view of the blower fan with an upper plate portion and a side wall portion removed from the blower fan.

FIG. 7 is a plan view of the blower fan 1. FIG. 8 is a plan view of the blower fan 1 with the upper plate portion 51 and the side wall portion 53 removed from the blower fan 1. In the case where the upper plate portion 51 and the side wall portion 53 are provided in the device in which the blower fan 1 is installed, the blower fan 1 is substantially as illustrated in FIG. 8 before being installed in the device. Therefore, the lower plate portion 52 defines the air channel portion 50 and the air outlet 55 together with the side wall portion 53 and the upper plate portion 51 when the side wall portion 53 and the upper plate portion 51 are present.

Referring to FIG. 7, the air inlet 54 of the blower fan 1 axially overlaps with the rotor hub portion 28, the impeller support portion 29, and the inner blade portions 31a. A portion of each coil 212 of the stator 210 or each coil 212 in its entirety also axially overlaps with the air inlet 54. In principle, each outer blade portion 31b is located in the air channel portion 50, and does not axially overlap with the air inlet 54.

Referring to FIG. 8, the circuit board 56 includes a curved portion 561 and a led-out portion 562. The curved portion 561 is arranged to extend in an arc along the air channel portion 50. The led-out portion 562 is arranged to extend radially outward from the curved portion 561. A slit gap through which the led-out portion 562 is inserted is defined between the side wall portion 53 and the lower plate portion 52. The circuit board 56 is a flexible printed circuit (FPC) board. In a plan view, each of an upstream edge and a downstream edge (defined with respect to an air-blowing direction) of the curved portion 561 is in the shape of an arc. Because the edges of the curved portion 561 at both circumferential ends are both in the shape of an arc, the extent to which either edge of the curved portion 561 would be lifted away from the lower plate portion 52 if that should happen is reduced compared to the case where the edge has a corner portion. This contributes to reducing a decrease in air blowing efficiency. Note that it is preferable that an arc-shaped edge should be defined at least at an upstream end (defined with respect to the air-blowing direction) of the curved portion 561.

The radial width of the air channel portion 50 is arranged to substantially gradually decrease toward an upstream end with respect to the air-blowing direction. Therefore, in a plan view of the curved portion 561, the radial width of the curved portion 561 is preferably arranged to gradually decrease toward the upstream end with respect to the air-blowing direction. This allows the curved portion 561 to be easily arranged on the lower plate portion 52 while securing a sufficient width of the curved portion 561. A radially inner edge and a radially outer edge of the curved portion 561 are arranged adjacent to the stator holding portion 523 and the side wall portion 53, respectively. In FIG. 8, the side wall portion 53 is represented by a chain double-dashed line. Since the blower fan 1 is of a small size, the curved portion 561 according to the present preferred embodiment is arranged to have a circumferential extension equal to or greater than a quadrant.

Each of the lead wires 215 extending from the stator 210 is connected to the curved portion 561 of the circuit board 56 in the air channel portion 50. In the present preferred embodiment, the number of lead wires 215 is four. Moreover, in the present preferred embodiment, each lead wire 215 and the circuit board 56 are connected to each other through the solder. A position (i.e., a connection portion 563) at which each lead wire 215 and the circuit board 56 are connected to each other is arranged radially outward of the impeller portion 3. Interference of the connection portion 563 with the impeller portion 3 is thereby easily avoided. As a result, a sufficient axial dimension of each outer blade portion 31b is secured, and an improvement in the air volume is achieved. The above arrangement of the connection portions 563 is especially appropriate in the case where the connection is accomplished by use of the solder and each connection portion 563 has a great height. Needless to say, in the case where each connection portion 563 has a sufficiently small height, the connection portion 563 may be arranged under the blades 31.

An axial magnetic center of the stator 210 is arranged at a level lower than that of an axial magnetic center of the rotor magnet 262. This prevents the impeller portion 3 from moving downward after assemblage. This in turn securely prevents each blade 31 from coming into contact with any lead wire 215 located below after the assemblage.

Since each lead wire 215 and the circuit board 56 are connected to each other in the air channel portion 50, a reduction in the number of components which axially overlap with the circuit board 56 is achieved, and a reduction in the thickness of the blower fan 1 is easily achieved. In addition, increases in the axial dimension of each blade 31 and a space between the upper plate portion 51 and each blade 31 are also achieved, and a sufficient air volume of the blower fan 1 is easily secured.

In view of reducing noise, each connection portion 563 is preferably located as far away from the impeller portion 3 as possible. Therefore, the position at which each lead wire 215 and the circuit board 56 are connected to each other is located in the middle of the curved portion 561 or radially outward of the middle of the curved portion 561 with respect to a radial direction, i.e., a width direction of the curved portion 561.

Each lead wire 215 and the circuit board 56 are connected to each other before a unified combination of the side wall portion 53 and the upper plate portion 51 is fitted to the lower plate portion 52. In order to facilitate the connecting operations, positions at which the respective lead wires 215 are connected to the circuit board 56 are spaced from one another in the circumferential direction. Accordingly, each lead wire 215 is drawn radially outward through a different slot of the stator 210. Preferably, the connection positions are circumferentially spaced from one another by an angle equal to or greater than a slot pitch angle of the stator 210. Moreover, the connection positions are circumferentially spaced from one another by a distance equal to or greater than the radial width of the curved portion 561.

Referring to FIG. 2, each lead wire 215 is drawn radially outward along the slanting surface 524, which is the outer circumferential surface of the stator holding portion 523. When an operator performs the connecting operations, each lead wire 215 is drawn radially outward along the slanting surface 524, and the lead wire 215 is soldered to a land on the circuit board 56. Since the side wall portion 53 is not present at this time, the operator is able to freely use a space radially outside the stator holding portion 523. After the soldering, an extra portion of the lead wire 215 is cut off. Since each lead wire 215 is arranged to extend along the slanting surface 524, the probability that a tool will make contact with any lead wire 215 already connected to the circuit board 56 to cause a break in the lead wire 215 when performing an operation of connecting another one of the lead wires 215 to the circuit board 56 is reduced.

Each of the stator 210 and the rotor magnet 262 is arranged as low as possible in order to achieve a reduction in the thickness of the blower fan 1. Referring to FIG. 2, the core back 213 is arranged at a level lower than that of a tip of each tooth 214. An upper surface of the circuit board 56 is arranged at a level higher than that of a lower surface of the core back 213, that is, a lowermost surface of the stator core 211.

A portion of the lower plate portion 52 on which the circuit board 56 is arranged is arranged to have a very small thickness. A portion of the lower plate portion 52 which is in the vicinity of the air outlet 55 is arranged to have a greater thickness than that of the portion of the lower plate portion 52 on which the circuit board 56 is arranged, in order to secure sufficient rigidity of the lower plate portion 52. Referring to FIG. 8, the upper surface of the lower plate portion 52 includes a board mounting surface 525 on which the circuit board 56 is mounted, an air outlet surface 526 arranged in the vicinity of the air outlet 55, and a slanting surface 527. The board mounting surface 525 is arranged at a level lower than that of the air outlet surface 526. The board mounting surface 525 and the air outlet surface 526 are joined to each other through the slanting surface 527. Provision of the slanting surface 527 contributes to reducing a deterioration in the air-blowing performance while securing sufficient rigidity of the lower plate portion 52.

Referring to FIG. 2, the upper surface of the lower plate portion 52 further includes a below-magnet surface 528 arranged axially opposite the rotor magnet 262. In order to ensure that the bearing portion 23 is supported by the bearing holding portion 521 with sufficient reliability, the board mounting surface 525 is arranged at a level lower than that of the below-magnet surface 528. This enables the lower plate portion 52 to easily have a greater thickness at the below-magnet surface 528 than at the board mounting surface 525, and also makes it possible to reduce an overall thickness of the lower plate portion 52. In this case, the lower plate portion 52 is preferably molded of a non-magnetic material.

Figure 9:
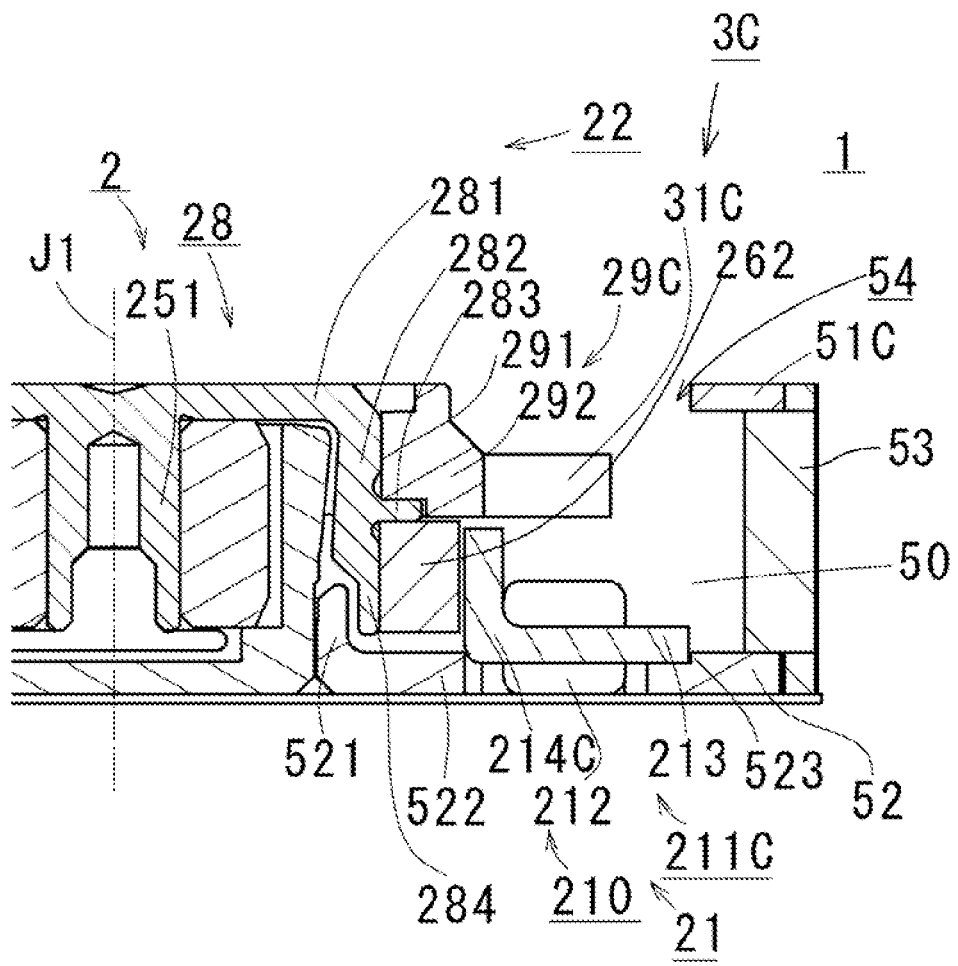
FIG. 9 is a vertical cross-sectional view of a motor portion of a blower fan according to a second preferred embodiment of the present invention and its vicinity.

FIG. 9 is a cross-sectional view of a motor portion 2 of a blower fan 1 according to a second preferred embodiment of the present invention and its vicinity. The blower fan 1 illustrated in FIG. 9 has a size even smaller than that of the blower fan according to the first preferred embodiment. A radially outer edge of each of blades 31C of the blower fan 1 is arranged radially inward of an outer circumferential surface of a stator 210. An impeller support portion 29C includes an impeller cylindrical portion 291 and an impeller ring portion 292. A lower end of the impeller ring portion 292 is arranged at a level higher than that of a lower surface of a raised portion 283. A lower surface of the impeller ring portion 292 is arranged opposite to an upper surface of a rotor magnet 262 with a gap intervening therebetween. An upper surface of the impeller ring portion 292 includes a slanting surface continuous with the impeller cylindrical portion 291.

The blades 31C are arranged above the stator 210. An inner end of each blade 31C is arranged axially opposite a tip portion of a tooth 214C. An outer end of the blade 31C is arranged radially inward of the outer circumferential surface of the stator 210. The outer end of the blade 31C is substantially arranged axially opposite an outer end portion of a coil 212. The above arrangements allow an outer end of an upper portion of the stator 210 to be exposed to an air channel portion 50 to enable cooling of the stator 210. In addition, the outer end of each blade 31C is arranged radially inward of an inner edge of an upper plate portion 51C. In other words, it is possible to view the outer end of the blade 31C through an air inlet 54 in a plan view. A lower end of the blade 31C is arranged to be flush with the lower end of the impeller ring portion 292. The lower end of the blade 31C is arranged at a level higher than that of the lower surface of the raised portion 283 and that of the upper surface of the rotor magnet 262.

A stator core 211C is defined by a silicon steel sheet in the shape of a thin plate. The stator core 211C includes a substantially annular core back 213 and a plurality of teeth 214C arranged to project radially inward from the core back 213. The tip portion of each tooth 214C is bent axially upward, and an inner surface of the bent tip portion of the tooth 214C is arranged radially opposite an outer circumferential surface of the rotor magnet 262. An upper end of the tip portion of the tooth 214C is arranged opposite to an impeller portion 3C. Although the stator core 211C according to the present preferred embodiment is assumed to be defined by a single silicon steel sheet, the stator core 211C may be defined by laminated silicon steel sheets, with only one of the silicon steel sheets being bent.

The core back 213 is inserted in a stator holding portion 523. The stator holding portion 523 according to the present preferred embodiment, which is arranged to hold the stator 210, is not arranged to project upward, but is defined by a recessed portion defined in a lower plate portion 52. The motor portion 2 according to the present preferred embodiment is otherwise substantially similar in structure to the motor portion 2 illustrated in FIG. 2. Accordingly, like members or portions are designated by like reference numerals, and redundant description is omitted.

In the blower fan 1 illustrated in FIG. 9, a side wall portion 53 and the stator 210 are arranged close to each other. Accordingly, a circuit board 56 is arranged in the vicinity of an air outlet 55 in the air channel portion 50. Therefore, when an interior of the blower fan 1 is viewed through the air outlet 55, the circuit board 56 and the connection portions 563 are recognizable with eyes. The impeller portion 3C and the side wall portion 53 are spaced away from each other by 1 mm or more.

Figure 10:
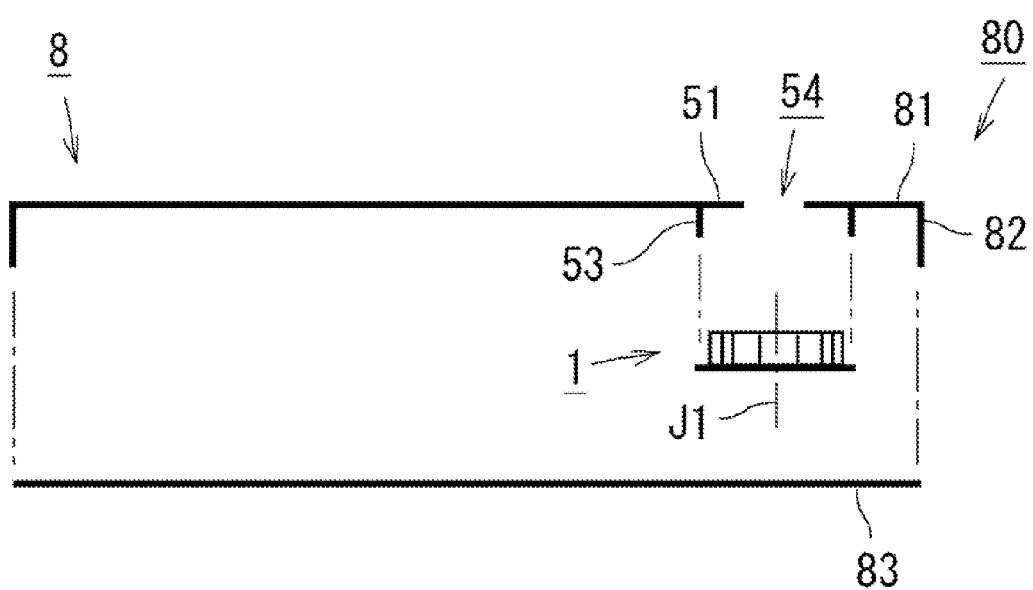
FIG. 10 is a vertical cross-sectional view illustrating an electronic device according to a preferred embodiment of the present invention.

FIG. 10 is a vertical cross-sectional view illustrating an exemplary electronic device 8 including the blower fan 1. In FIG. 10, the electronic device 8 is vertically disassembled. A case 80 of the electronic device 8 includes a top plate 81, a side plate 82, and a bottom plate 83. A portion of the top plate 81 is arranged to define the upper plate portion 51 of the blower fan 1. Note that the entire top plate 81 may be arranged to define the upper plate portion 51. That is, the top plate 81 is arranged to cover at least a portion of an upper side of the blower fan 1. The side wall portion 53 is arranged to project downward from the top plate 81. That is, the top plate 81 and the side wall portion 53 are defined integrally with each other.

The lower plate portion 52 of the blower fan 1 is joined to the side wall portion 53 to define the air outlet 55. The side plate 82 is arranged on a lateral side of the blower fan 1. The side plate 82 is arranged to extend downward from an outer circumferential portion of the top plate 81. A portion of the side plate 82 may be arranged to define the side wall portion 53 of the blower fan 1. The side plate 82 is arranged to cover at least a portion of the lateral side of the blower fan 1. The upper plate portion 51 includes a hole arranged to define the air inlet 54 above the central axis J1. The bottom plate 83 is arranged below the blower fan 1. The bottom plate 83 is joined to a lower end of the side plate 82.

The structures of the blower fan 1 and the electronic device 8 described above may be modified in a variety of manners.

For example, the number of grooves 278 defined in the outer circumferential surface of the sleeve 231 may be more than two. Also, the outer circumferential surface of the sleeve 231 may include no grooves.

A material of any member of the impeller portion 3, the bearing mechanism 4, the housing 5, or the like may be changed appropriately. For example, the sleeve 231 may not necessarily be made of a sintered metal. The sleeve housing 232 may be made of a metal. For example, the sleeve housing 232 may be made of aluminum or the like, and be molded by die casting. The impeller portion 3 may also be made of a metal.

In the motor portion 2 illustrated in FIG. 1, both the stator 210 and the bearing portion 23 are directly fixed to the lower plate portion 52, which is the base portion. Note, however, that a member such as a bushing or the like may be arranged to intervene between the lower plate portion 52 and at least one of the stator 210 and the bearing portion 23, so that the at least one of the stator 210 and the bearing portion 23 is indirectly fixed to the lower plate portion 52.

The first thrust dynamic pressure groove array 275 may be defined in an upper surface of the sleeve housing 232, or in a region opposed to the upper surface of the sleeve housing 232 in the lower surface of the bearing opposing portion 281. In other words, the first thrust dynamic pressure groove array 275 is defined in at least one of the upper surface of the bearing portion 23 and the lower surface of the bearing opposing portion 281. As a result, the first thrust dynamic pressure bearing portion 44a is defined between the upper surface of the bearing portion 23 and the lower surface of the bearing opposing portion 281.

The second thrust dynamic pressure bearing portion 43a may be omitted. In this case, the plate portion 256 only functions as a portion to prevent the shaft 251 from coming off the bearing portion 23. The first thrust dynamic pressure bearing portion 44a may also be omitted.

Each of the first and second radial dynamic pressure groove arrays 272 and 273 may be omitted.

Another structure may be used as the bearing mechanism 4. The position of the surface of the lubricating oil 40 may be changed. The bearing mechanism 4 may be replaced with a bearing mechanism which does not use a fluid dynamic pressure.

The rotor magnet 262 may be directly fixed to the rotor hub portion 28, or may be indirectly fixed to the rotor hub portion 28 with another member intervening therebetween. The rotor magnet 262 and the rotor hub portion 28 may be defined integrally with each other. Even in this case, the rotor magnet 262 can be substantially considered to be fixed to the rotor hub portion 28.

The curved portion 561 does not need to be a tapered portion which gradually decreases in width along an entire length thereof. For example, only a portion of the curved portion 561 may be a tapered portion which gradually decreases in width toward an upstream end with respect to the air-blowing direction.

In the blower fan 1, the air inlet 54 may be defined in each of the upper plate portion 51 and the lower plate portion 52, and also, the air inlet 54 may be defined only in the lower plate portion 52.

Electronic components may be arranged on the circuit board 56. For example, the electronic components may be arranged in the vicinity of the air outlet 55, preferably in the vicinity of a tongue portion arranged to project radially inward at an upstream end of the side wall portion 53, with the curved portion 561 extended toward the air outlet 55.

The entire curved portion 531 does not need to be arranged in the air channel portion 50. For example, the side wall portion 53 may include a recessed portion recessed radially outward at a junction of the side wall portion 53 and the lower plate portion 52, with a portion of the curved portion 531 arranged to enter into the recessed portion. Further, a portion of any of the connection portions 563, at which the lead wires 215 and the curved portion 561 are connected to each other, may be arranged to enter into the recessed portion. A hole passing through the side wall portion 53 may be defined in place of the recessed portion.

The entire circuit board 56 may be arranged in the air channel portion 50. At least a portion of the circuit board 56 is arranged in the air channel portion 50 and on the lower plate portion 52.

Features of the above-described preferred embodiments and the modifications thereof may be combined appropriately as long as no conflict arises.

Blower fans according to preferred embodiments of the present invention are usable to cool interiors of notebook PCs and tablet PCs, to cool devices inside cases of desktop PCs, to cool other devices, to supply an air to a variety of objects, and so on. Moreover, blower fans according to preferred embodiments of the present invention are also usable for other purposes.

The preferred embodiments of the present invention and modifications thereof are applicable to spindle motors and disk drive apparatuses.

Features of the above-described preferred embodiments and the modifications thereof may be combined appropriately as long as no conflict arises.

While preferred embodiments of the present invention and modifications thereof have been described above, it is to be understood that additional variations and modifications will be apparent to those skilled in the art without departing from the scope and spirit of the present invention. The scope of the present invention, therefore, is to be determined solely by the following claims.

What is claimed is:

1. A blower fan comprising:
a stationary portion;
a bearing mechanism; and
a rotating portion supported by the bearing mechanism to be rotatable about a central axis extending in a vertical direction with respect to the stationary portion; wherein
the stationary portion includes:
a lower plate portion arranged to extend in directions away from the central axis;
an annular stator arranged on the lower plate portion; and
a circuit board;
the rotating portion includes:
an annular rotor magnet arranged radially inside the stator;
a rotor hub portion to which the rotor magnet is directly fixed or indirectly fixed with another member intervening therebetween; and
an impeller portion fixed to the rotor hub portion;
the impeller portion includes a plurality of blades arranged in a circumferential direction;
at least a portion of each of the blades is arranged above the stator;
when a side wall portion arranged to surround an outer circumference of the impeller portion and an upper plate portion arranged above the impeller portion are present, the lower plate portion is arranged to define an air channel portion in which an air is caused by the impeller portion to flow in the circumferential direction and an air outlet arranged on a lateral side of the impeller portion together with the side wall portion and the upper plate portion;
at least one of the upper plate portion and the lower plate portion includes an air inlet;
the air channel portion is a space which is located between an outer circumference of the stator and the side wall portion, extends in the circumferential direction, and reaches an upper surface of the lower plate portion at an axially lower end;
at least a portion of the circuit board is arranged in the air channel portion and on the lower plate portion; and
a plurality of lead wires extending from the stator are connected to the circuit board in the air channel portion.

2. The blower fan according to claim 1, wherein a position at which each lead wire is connected to the circuit board is located radially outward of the impeller portion.

3. The blower fan according to claim 2, wherein each lead wire is connected to the circuit board through a solder.

4. The blower fan according to claim 1, wherein the circuit board includes a curved portion arranged to extend along the air channel portion.

5. The blower fan according to claim 4, wherein, in a plan view of the curved portion, the curved portion includes a tapered portion arranged to gradually decrease in radial width toward an upstream end with respect to an air-blowing direction.

6. The blower fan according to claim 4, wherein, in a plan view of the curved portion, the curved portion includes an arc-shaped edge at an upstream end with respect to an air-blowing direction.

7. The blower fan according to claim 6, wherein, in the plan view of the curved portion, the curved portion includes a tapered portion arranged to gradually decrease in radial width toward an upstream end with respect to the air-blowing direction.

8. The blower fan according to claim 4, wherein a position at which each lead wire is connected to the circuit board is located in a radial middle of the curved portion or radially outward of the radial middle of the curved portion.

9. The blower fan according to claim 1, wherein
the lower plate portion includes a stator holding portion arranged to project upward from the upper surface thereof, the stator holding portion being annular, centered on the central axis, and arranged to be in contact with an outer circumferential surface of the stator;
the stator holding portion is arranged in the air channel portion; and
the circuit board is arranged radially outward of the stator holding portion.

10. The blower fan according to claim 9, wherein
an outer circumferential surface of the stator holding portion is a slanting surface arranged to extend radially outward with decreasing height; and
each lead wire is drawn radially outward along the slanting surface.

11. The blower fan according to claim 1, wherein each lead wire is drawn radially outward through a different slot of the stator.

12. The blower fan according to claim 11, wherein positions at which the respective lead wires are connected to the circuit board are circumferentially spaced from one another by an angle equal to or greater than a slot pitch angle of the stator.

13. The blower fan according to claim 1, wherein an upper surface of the circuit board is arranged at a level higher than that of a lowermost surface of a core of the stator.

14. The blower fan according to claim 1, wherein
the upper surface of the lower plate portion includes a board mounting surface on which the circuit board is mounted, an air outlet surface arranged in a vicinity of the air outlet, and a slanting surface;
the board mounting surface is arranged at a level lower than that of the air outlet surface; and the board mounting surface and the air outlet surface are joined to each other through the slanting surface.

15. The blower fan according to claim 14, wherein
the upper surface of the lower plate portion further includes
   a below-magnet surface arranged axially opposite the rotor magnet; and
the board mounting surface is arranged at a level lower than that of the below-magnet surface.

16. An electronic device comprising:
a case; and
the blower fan according to claim 1, the blower fan being arranged inside the case; wherein
the case includes:
   a top plate arranged to cover at least a portion of an upper side of the blower fan;
   a side plate arranged on a lateral side of the blower fan; and
   a bottom plate arranged below the blower fan;
at least a portion of the top plate is arranged to define the upper plate portion; and
the upper plate portion includes the air inlet above the central axis.

\* \* \* \* \*